(12) United States Patent
Tsai et al.

(10) Patent No.: US 8,774,333 B2
(45) Date of Patent: Jul. 8, 2014

(54) SIGNAL PROCESSING APPARATUS AND RELATED METHOD FOR GENERATING TARGET ESTIMATED SIGNAL OF SPECIFIC SIGNAL COMPONENT IN INPUT SIGNAL

(75) Inventors: Wen-Chieh Tsai, Pingtung County (TW); Kuan-I Li, Kaohsiung (TW); Chun-Nan Chen, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 550 days.

(21) Appl. No.: 12/916,623

(22) Filed: Oct. 31, 2010

(65) Prior Publication Data
US 2012/0106685 A1 May 3, 2012

(51) Int. Cl.
*H04L 25/08* (2006.01)
(52) U.S. Cl.
USPC .......................................... 375/346; 375/344
(58) Field of Classification Search
USPC ................................................ 375/344, 346
See application file for complete search history.

(56) References Cited

U.S. PATENT DOCUMENTS

| | | | | |
|---|---|---|---|---|
| 4,947,361 | A | * | 8/1990 | Smith et al. .................... 708/312 |
| 5,165,051 | A | * | 11/1992 | Kumar ........................ 324/76.47 |
| 2004/0028121 | A1 | * | 2/2004 | Fitton ............................ 375/144 |
| 2005/0118963 | A1 | * | 6/2005 | Chiu .......................... 455/115.1 |
| 2006/0170499 | A1 | * | 8/2006 | Rahman et al. ............... 330/279 |
| 2009/0316849 | A1 | | 12/2009 | Zolfaghari |
| 2010/0020906 | A1 | | 1/2010 | Kaiki |
| 2010/0041357 | A1 | | 2/2010 | Wang |
| 2010/0052981 | A1 | * | 3/2010 | Alexander et al. ........ 342/357.06 |

* cited by examiner

*Primary Examiner* — Michael Neff
(74) *Attorney, Agent, or Firm* — Winston Hsu; Scott Margo

(57) ABSTRACT

A signal processing apparatus includes a signal generating block arranged to generate a target estimated signal of a specific signal component in an input signal. The signal generating block includes a reference signal generating circuit, a signal processing circuit, and a signal adjusting circuit. The reference signal generating circuit is arranged to generate a reference estimated signal for the specific signal component in the input signal. The signal processing circuit is coupled to the reference signal generating circuit, and arranged to process the reference estimated signal and accordingly generate a signal processing result. The signal adjusting circuit is coupled to the signal processing circuit and the reference signal generating circuit, and arranged to output the target estimated signal by adjusting the reference estimated signal according to the signal processing result.

17 Claims, 8 Drawing Sheets

SIGNAL PROCESSING APPARATUS AND RELATED METHOD FOR GENERATING TARGET ESTIMATED SIGNAL OF SPECIFIC SIGNAL COMPONENT IN INPUT SIGNAL

BACKGROUND

The disclosed embodiments of the present invention relate to estimating a specific signal component in an input signal, and more particularly, to a signal processing apparatus and related method for generating a target estimated signal of a specific signal component in an input signal (e.g., a jammer signal included in the input signal).

Devices may need to determine their own position, to enable location-based or location-aware functionality and services. Global navigation satellite systems (GNSS), such as the Global Positioning System (GPS), the GLONAS system, and the GALILEO system, are the most widely used positioning technology. One of the most important issues related to GNSS receivers is how to suppress interference. Typically, in a situation where GNSS signals are extremely weak, they can be easily corrupted by interference. As a result, unrecoverable errors may occur in such a situation.

In particular, interference that comes from a harmonic frequency of a system clock (e.g. a CPU clock, or a pixel clock of a liquid crystal display module (LCM)) may fall within a GNSS band, causing in-band interference. According to the related art, the conventional interference suppression method is complicated and is by no means a low-cost solution. Thus, there is a need for a low-cost structure which can realize the interference estimation and elimination.

SUMMARY

In accordance with exemplary embodiments of the present invention, a signal processing apparatus and related method for generating a target estimated signal of a specific signal component in an input signal (e.g., a jammer signal included in the input signal) are proposed.

According to a first aspect of the present invention, an exemplary signal processing apparatus is disclosed. The exemplary signal processing apparatus includes a signal generating block arranged to generate a target estimated signal of a specific signal component in an input signal. The signal generating block includes a reference signal generating circuit, a signal processing circuit, and a signal adjusting circuit. The reference signal generating circuit is arranged to generate a reference estimated signal for the specific signal component in the input signal. The signal processing circuit is coupled to the reference signal generating circuit, and arranged to process the reference estimated signal and accordingly generate a signal processing result. The signal adjusting circuit is coupled to the signal processing circuit and the reference signal generating circuit, and arranged to output the target estimated signal by adjusting the reference estimated signal according to the signal processing result.

According to a second aspect of the present invention, an exemplary signal processing method is disclosed. The exemplary signal processing method includes the following steps: generating a reference estimated signal for a specific signal component in an input signal; processing the reference estimated signal and accordingly generating a signal processing result; and outputting a target estimated signal of the specific signal component in the input signal by adjusting the reference estimated signal according to the signal processing result.

According to a third aspect of the present invention, an exemplary signal processing apparatus is disclosed. The exemplary signal processing apparatus includes a signal generating block arranged to generate a target estimated signal of a specific signal component in an input signal. The signal generating block includes a reference signal generating circuit and a frequency adjusting circuit. The reference signal generating circuit is arranged to generate a reference estimated signal for the specific signal component in the input signal. The frequency adjusting circuit is coupled to the reference signal generating circuit, and arranged to estimate a frequency offset between frequency of the target estimated signal and frequency of the specific signal component in the input signal by referring to information derived from the reference estimated signal, and to adjust output frequency of the reference signal generating circuit according to the frequency offset so as to decrease the frequency offset.

According to a fourth aspect of the present invention, an exemplary signal processing apparatus is disclosed. The exemplary signal processing apparatus includes a plurality of signal generating blocks each arranged to generate a target estimated signal of a specific signal component in an input signal, and a signal subtracting unit. Each of the signal generating blocks includes a reference signal generating circuit, a signal processing circuit, and a signal adjusting circuit. The reference signal generating circuit is arranged to generate a reference estimated signal for the specific signal component in the input signal. The signal processing circuit is coupled to the reference signal generating circuit, and arranged to process the reference estimated signal and accordingly generate a signal processing result. The signal adjusting circuit is coupled to the signal processing circuit and the reference signal generating circuit, and arranged to output the target estimated signal by adjusting the reference estimated signal according to the signal processing result. The signal subtracting unit is coupled to the signal generating blocks, and arranged to subtract a plurality of target estimated signals respectively generated by the signal generating blocks from the input signal of the signal processing apparatus and accordingly generate an output signal of the signal processing apparatus.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "electrically connected" is intended to mean either an indirect or direct electrical connection. Accordingly, if one device is electrically connected to another device, that connection may be through a direct electrical connection, or through an indirect electrical connection via other devices and connections. Technical features of the present invention are detailed as follows.

Figure 1:
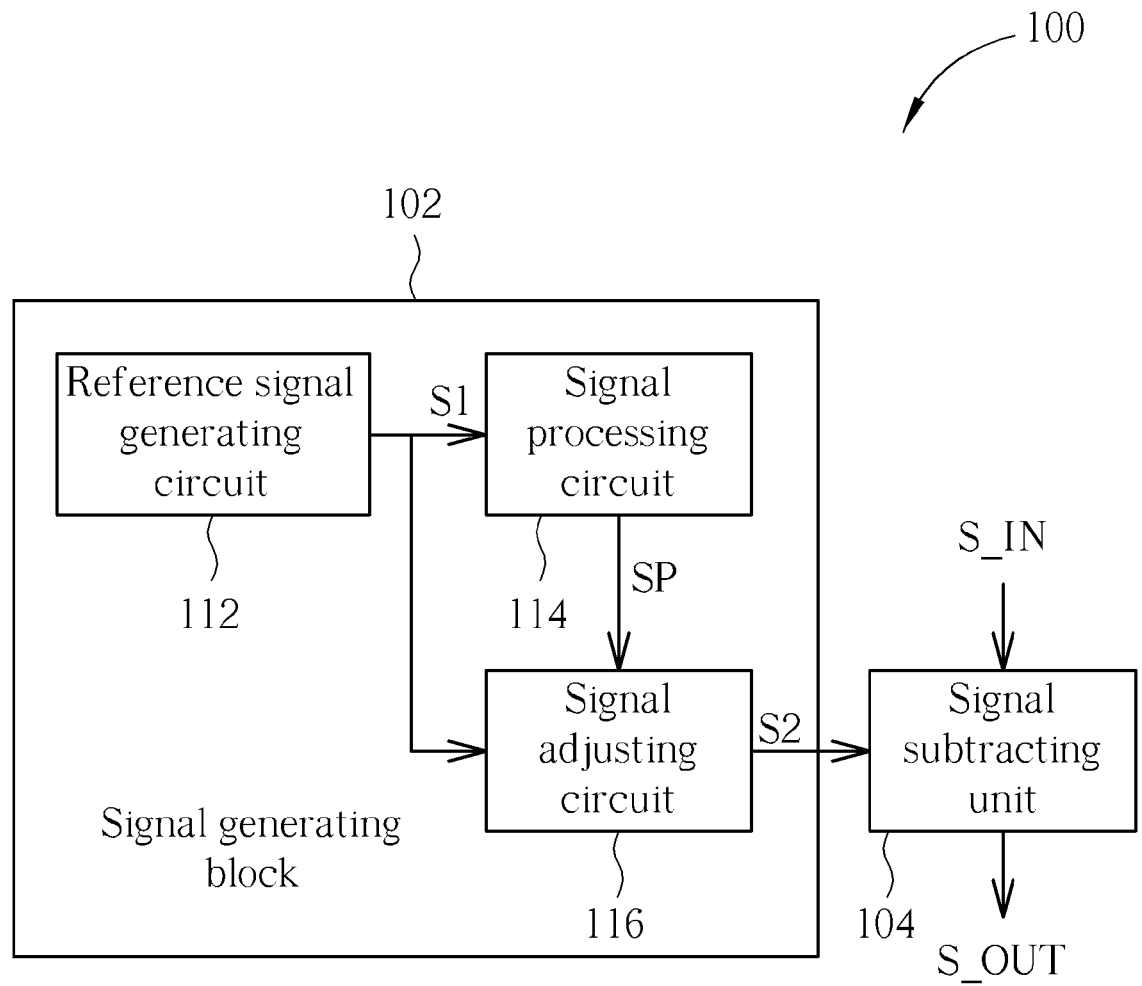
FIG. 1 is a block diagram illustrating a generalized signal processing apparatus according to the present invention.

FIG. 1 is a block diagram illustrating a generalized signal processing apparatus according to the present invention. The signal processing apparatus 100 includes a signal generating block 102 and a signal subtracting unit 104, wherein the signal generating block 102 includes, but is not limited to, a reference signal generating circuit 112, a signal processing circuit 114, and a signal adjusting circuit 116. The signal generating block 102 is arranged to generate a target estimated signal S2 of a specific signal component in an input signal S_IN (e.g., a jammer signal in the input signal S_IN). The signal subtracting unit 104 is coupled to the signal generating block 102, and arranged to generate an output signal S_OUT of the signal processing apparatus 100 by subtracting the target estimated signal S2 from the input signal S_IN of the signal processing apparatus 100. The reference signal generating circuit 112 is arranged to generate a reference estimated signal S1 for the above-mentioned specific signal component in the input signal S_IN. For example, the waveform of the specific signal component in the input signal S_IN is known in advance, and the reference signal generating circuit 112 therefore can be properly configured to generate the reference estimated signal S1 with a waveform similar/identical to the known waveform of the specific signal component in the input signal S_IN. By way of example, but not limitation, the reference estimated signal S1 may be a single-tone continuous wave signal or a multi-tone continuous wave signal, depending upon the waveform of the specific signal component in the input signal S_IN. The signal processing circuit 114 is coupled to the reference signal generating circuit 112, and arranged to process the reference estimated signal S1 and accordingly generate a signal processing result SP. The signal adjusting circuit 116 is coupled to the signal processing circuit 114 and the reference signal generating circuit 112, and arranged to output the target estimated signal S2 by adjusting the reference estimated signal S1 according to the signal processing result SP.

To put it simply, the reference signal generating circuit 112, such as a numerically-controlled oscillator (NCO), a voltage-controlled oscillator (VCO) or other signal source, generates the reference estimated signal S1 with initially-predicted amplitude and frequency for the specific signal component in the input signal S_IN, the signal processing circuit 114 processes the reference estimated signal S1 to generate the signal processing result SP which provides information associated with the difference between the reference estimated signal S1 and the specific signal component in the input signal S_IN, and the signal adjusting circuit 116 applies amplitude/frequency adjustment to the reference estimated signal S1 based on the information provided by the signal processing result SP and accordingly updates the target estimated signal S2 to make amplitude and frequency of the updated target estimated signal S2 similar/identical to that of the specific signal component in the input signal S_IN.

In addition, the signal processing apparatus 100 may serve as a narrowband interference estimation and elimination apparatus. Thus, when the signal generating block 102 generates an interference mimic (i.e., the target estimated signal S2) corresponding to a jammer signal in the input signal S_IN, the signal subtracting unit 104 is implemented to apply interference suppression to the input signal S_IN by subtracting the interference mimic from the input signal S_IN. In this way, the output signal S_OUT may be an interference-free signal if the jammer signal in the input signal S_IN is accurately tracked using the signal generating block 102. To more clearly describe technical features of the present invention, several exemplary implementations using the circuit configuration shown in FIG. 1 are detailed as follows.

Figure 2:
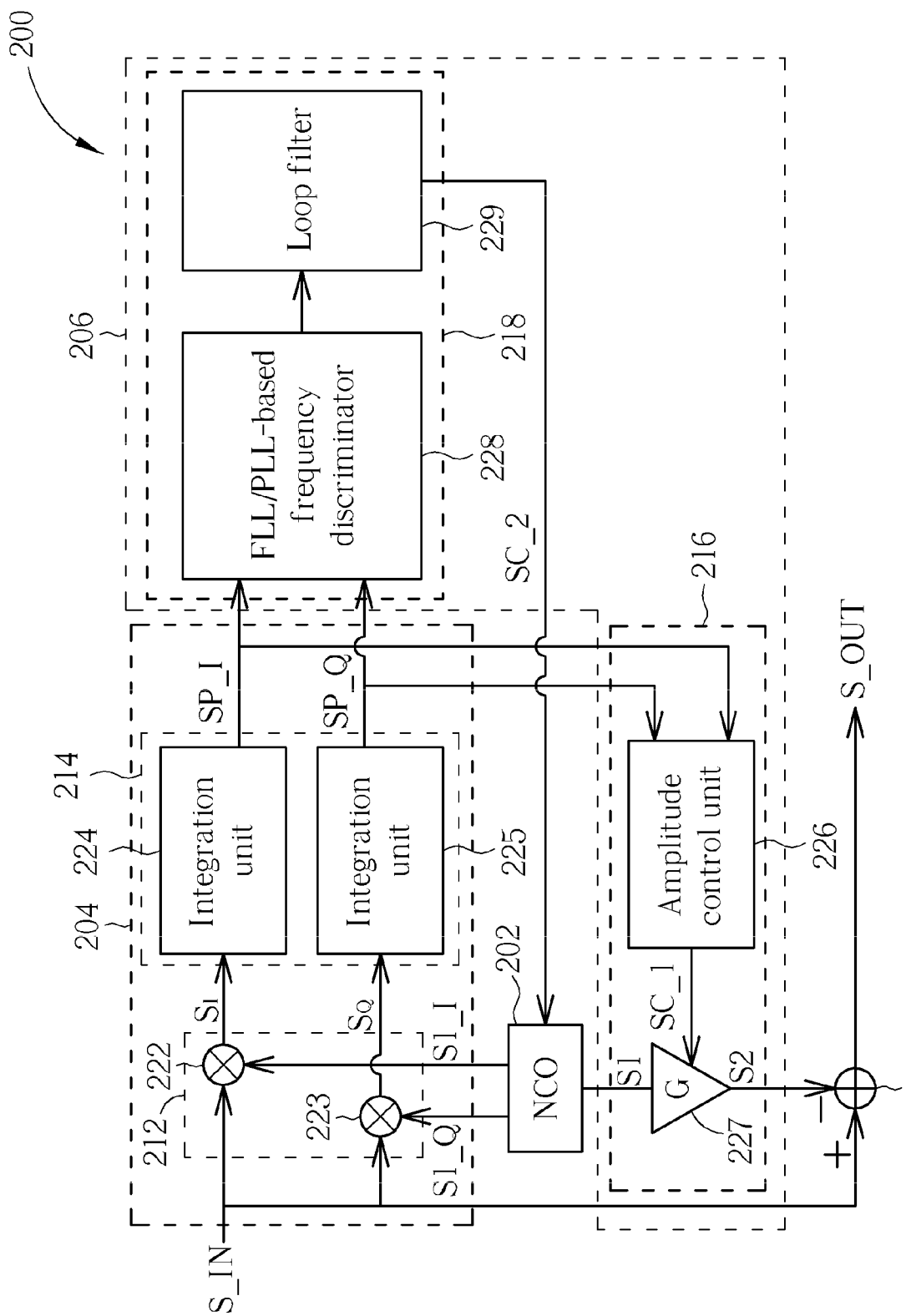
FIG. 2 is a diagram illustrating a first exemplary implementation of a signal processing apparatus according to the present invention.

Please refer to FIG. 2, which is a diagram illustrating a first exemplary implementation of a signal processing apparatus according to the present invention. The exemplary processing apparatus 200 is based on the circuit configuration shown in FIG. 1, and therefore has a signal source (e.g., an NCO 202) which realizes the reference signal generating circuit 112 in FIG. 1, a signal processing circuit 204 which realizes the signal processing circuit 114 in FIG. 1, a signal adjusting circuit 206 which realizes the signal adjusting circuit 116 in FIG. 1, and a logic circuit (e.g., an adder 208) which realizes the signal subtracting unit 104 in FIG. 1. As can be seen from FIG. 2, the combination of the NCO 202, the signal processing circuit 204, and the signal adjusting circuit 206 acts as the signal generating block 102 in FIG. 1. In this exemplary implementation, the signal processing circuit 204 includes a mixer module 212 and an integration module 214, wherein the mixer module 212 has a plurality of mixers 222 and 223, and the integration module 214 has a plurality of integration units 224 and 225. With regard to the signal adjusting circuit 206, it includes an amplitude adjusting module 216 and a frequency adjusting module 218, wherein the amplitude adjusting module 216 has an amplitude control unit 226 and an amplifier unit 227, and the frequency adjusting module 218 has a frequency-locked loop/phase-locked loop-based (FLL/PLL-based) frequency discriminator 228 and a loop filter 229. The operation of the exemplary signal processing apparatus 200 shown in FIG. 2 is detailed as follows.

Suppose that the specific signal component in the input signal S_IN to be tracked is known to be a continuous wave signal. Thus, the NCO 202 is implemented to generate a continuous wave signal which acts as the reference estimated signal S1 shown in FIG. 1. In this exemplary implementation, the reference estimated signal S1 includes a sine wave part S1_I and a cosine wave part S1_Q. Please note that the sine wave part S1_I and the cosine wave part S1_Q have the same frequency and amplitude but different phases. The mixer module 212 is arranged to generate a mixer output by mixing the input signal S_IN and the reference estimated signal S1. More specifically, the mixer 222 mixes the input signal S_IN and the sine wave part S1_I of the reference estimated signal to thereby generate a first part $S_I$ of the mixer output (e.g., an in-phase signal derived from the input signal S_IN), and the mixer 223 mixes the input signal S_IN and the cosine wave part S1_Q of the reference estimated signal to thereby generate a second part $S_Q$ of the mixer output (e.g., a quadrature signal derived from the input signal S_IN). The integration module 214 is coupled to the mixer module 212, and arranged to integrate the mixer output and accordingly generate an integration which acts as the signal processing result SP shown in FIG. 1. In this exemplary implementation, the integration unit 224 generates a first part SP_I of the signal processing result by integrating the first part $S_I$ of the mixer output, and the integration unit 225 generates a second part SP_Q of the signal processing result by integrating the second part $S_Q$ of the mixer output. More specifically, the operation performed by the signal processing circuit 204 is equivalent to a discrete Fourier transform (DFT).

Figure 3:
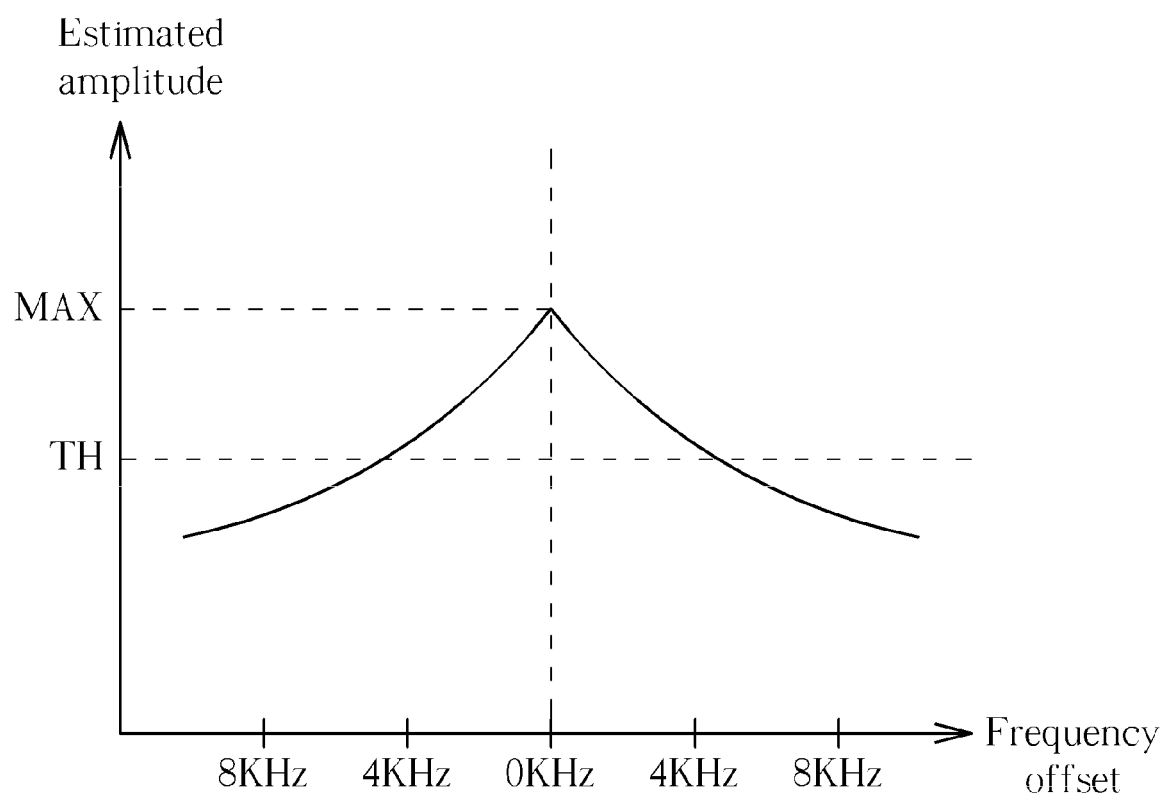
FIG. 3 is a diagram illustrating the exemplary relationship between an amplitude of an estimated interference signal and a frequency offset between the estimated interference signal and an actual interference signal.

The amplitude and frequency information carried by the signal processing result, including the first part SP_I and the second part SP_Q, can be referenced to determine how to set the target estimated signal S2. Please refer to FIG. 3, which is a diagram illustrating the exemplary relationship between the amplitude of the estimated interference signal and the frequency offset between the estimated interference signal and the actual interference signal. As can be seen from FIG. 3, when these is no frequency offset between the estimated interference signal and the actual interference signal, meaning that the frequency of the estimated interference signal matches the frequency of the actual interference signal to be eliminated, the amplitude of the estimated interference signal has a maximum level MAX. That is, the smaller is the frequency offset, the larger amplitude of the estimated interference signal is. Thus, based on such an observation, searching the input signal S_IN for the specific signal component (e.g., a jammer signal) can be accomplished by observing the frequency band, where the specific signal component in the input signal S_IN may be declared to be found by a comparison result of the amplitude of the estimated signal and a predetermined threshold TH.

As the magnitude of the signal processing result generated from the signal processing circuit 204 is proportional to the magnitude of the specific signal component in the input signal S_IN, the amplitude control unit 226 therefore generates a gain control signal SC_1 according to the first part SP_I and the second part SP_Q of the signal processing result. For example, the amplitude control unit 226 generates the gain control signal SC_1 according to a comparison result of a magnitude of the signal processing result and a predetermined threshold. When the signal processing apparatus 200 is implemented in a receiver system, information directed to the above-mentioned comparison result may be provided by other circuit component in the receiver system. Alternatively, the amplitude control unit 226 may be configured to estimate the magnitude MAG of the signal processing result according to the first part SP_I and the second part SP_Q (e.g., MAG= $\sqrt{SP\_I^2+SP\_Q^2}$, and then compare the magnitude MAG with a predetermined threshold MAG_TH. When the magnitude MAG is found greater than the predetermined threshold MAG_TH, meaning that the frequency of the estimated signal is close to the frequency of the specific signal component in the input signal S_IN, the amplitude control unit 226 adjusts the gain control signal SC_1 to fine tune the gain value G of the amplifier unit 227. The amplifier unit 227 is coupled to the amplitude control unit 226, and arranged to receive the gain control signal SC_1 and output the target estimated signal S2 by amplifying the reference estimated signal S1 with the gain value G set in response to the gain control signal SC_1.

In addition to adjusting the amplitude of the reference estimated signal S1 (i.e., the amplitude of the target estimated signal S2), the signal adjusting circuit 206 may adjust the frequency of the reference estimated signal S1 (i.e., the frequency of the target estimated signal S2) to further fine tune the target estimated signal S2 such that the target estimated signal S2 could be more similar to the specific signal component in the input signal S_IN. In this exemplary implementation, the NCO 202 used to realize the reference signal generating circuit 112 in FIG. 1 is a controllable signal source which adjusts the frequency of the reference estimated signal S1 in response to a frequency control signal SC_2. The frequency adjusting module 218 is therefore implemented to generate the frequency control signal SC_2 to the reference signal generating circuit (e.g., NCO 202) according to the signal processing result. More specifically, the FLL/PLL-based frequency discriminator 228 is arranged to discriminate a frequency offset between a frequency of an estimated signal (e.g., the frequency of the reference estimated signal S1/target estimated signal S2) and a frequency of a specific signal component of the input signal S_IN (e.g., the frequency of a jammer signal in the input signal S_IN), and then the loop filter 229 acts as an estimator which generates the frequency control signal SC_2 according to the output of the preceding FLL/PLL-based frequency discriminator 228.

In one exemplary design, the frequency adjusting module 218 may generate the frequency control signal SC_2 according to a comparison result of a magnitude of the signal processing result and a predetermined threshold. That is, only when the magnitude of the signal processing result is found greater than the predetermined threshold (i.e., MAG>MAG_TH), meaning that the frequency of the reference estimated signal S1/target estimated signal S2 is close to the frequency of the specific signal component in the input signal S_IN, the frequency adjusting module 218 is active to fine tune the frequency of the NCO 202.

The interference tracking operation performed by the frequency adjusting module 218 can be briefly summarized using following signal analysis. Suppose that the target estimated signal S2 is expressed as follows:

$$S2 = w_{0,n}\cos(\hat{\omega}_j n) + w_{1,n}\sin(\hat{\omega}_j n) \qquad (1)$$
$$= \sqrt{w_{0,n}^2 + w_{1,n}^2} \cdot \cos\left(\hat{\omega}_j + \tan^{-1}\left(\frac{w_{1,n}}{w_{0,n}}\right)\right)$$

In above equation (1), $\hat{\omega}_j$ represents the frequency of the target estimated signal S2, $\sqrt{w_{0,n}^2+w_{1,n}^2}$ represents the amplitude of the target estimated signal S2, $w_{0,n}\cos(\hat{\omega}_j n)$ represents the cosine wave part S1_Q, and $w_{1,n}\sin(\hat{\omega}_j n)$ represents the sine wave part S1_I. Thus, the frequency offset between the frequency $\hat{\omega}_j$ of the target estimated signal S2 and the frequency $\omega_j$ of the actual interference signal (i.e., the specific signal component to be tracked in the input signal S_IN) can be expressed as follows:

$$\Delta\omega = \omega_j - \hat{\omega}_j \qquad (2)$$

The frequency adjusting module 218 is therefore used to dynamically track the interference and estimate the frequency offset $\Delta\omega$ according to following equation (3).

$$\Delta\omega = \tan^{-1}\left(\frac{w_{1,n}}{w_{0,n}}\right) - \tan^{-1}\left(\frac{w_{1,n-1}}{w_{0,n-1}}\right) \qquad (3)$$

In this exemplary implementation shown in FIG. 2, the signal processing apparatus 200 may serve as a single-tone narrowband interference estimation and elimination apparatus. Thus, the target estimated signal S2 is an interference mimic corresponding to a single-tone interference signal in the input signal S_IN, and the adder 208 subtracts the target estimated signal S2 from the input signal S_IN to thereby reduce or eliminate the single-tone interference signal in the input signal S_IN.

Figure 4:
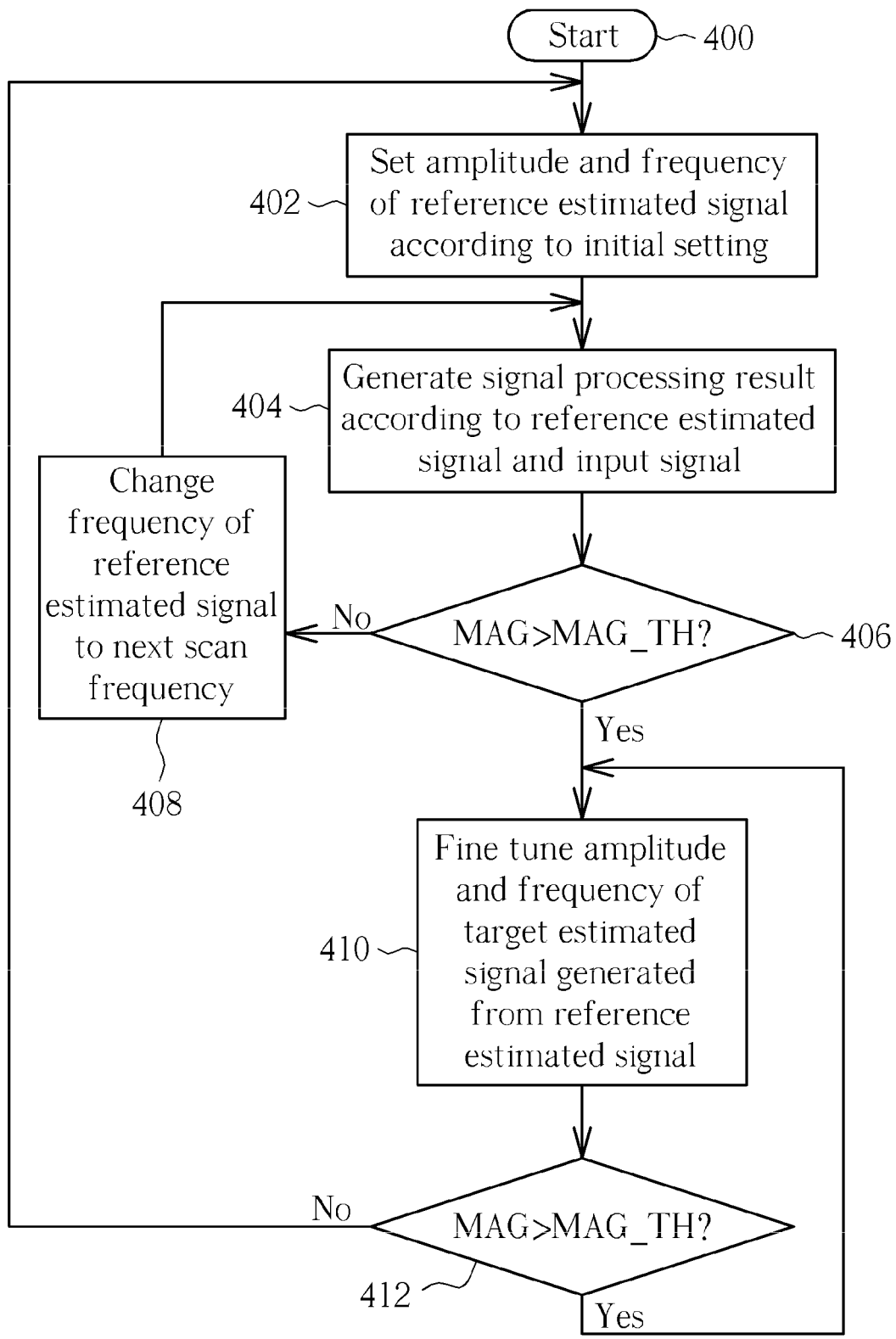
FIG. 4 is a flowchart illustrating an exemplary method of generating a target estimated signal according to the present invention.

FIG. 4 is a flowchart illustrating an exemplary method of generating a target estimated signal according to the present invention. The method may be employed by the signal processing apparatus 200 shown in FIG. 2. Please note that if the result is substantially the same, the steps are not required to be executed in the exact order shown in FIG. 4. The exemplary method can be briefly summarized as follows.

Step 400: Start.

Step 402: Set an amplitude and a frequency of a reference estimated signal according to an initial setting.

Step 404: Generate a signal processing result according to the reference estimated signal and an input signal.

Step 406: Check if a magnitude of the signal processing result exceeds a predetermined threshold. If yes, go to step 410; otherwise, go to step 408.

Step 408: Change the frequency of the reference estimated signal to a next scan frequency. Go to step 404.

Step 410: Fine tune the amplitude and the frequency of a target estimated signal generated from the reference estimated signal.

Step 412: Check if the magnitude of the signal processing result exceeds the predetermined threshold. If yes, go to step 410; otherwise, go to step 402.

Step 412 is to check where the tracked signal component in the input signal S_IN still exists. For example, the interference may not always exist in the input signal S_IN. In a case where the magnitude of the signal processing result does not exceed the predetermined threshold, implying that the tracked signal component no longer exists, the flow proceeds with step 402 to search the input signal S_IN for the specific signal component (e.g., a jammer signal) again.

As a person skilled in the art can readily understand operations of the steps shown in FIG. 4 after reading above paragraphs, further description is omitted here for the sake of brevity.

Figure 5:
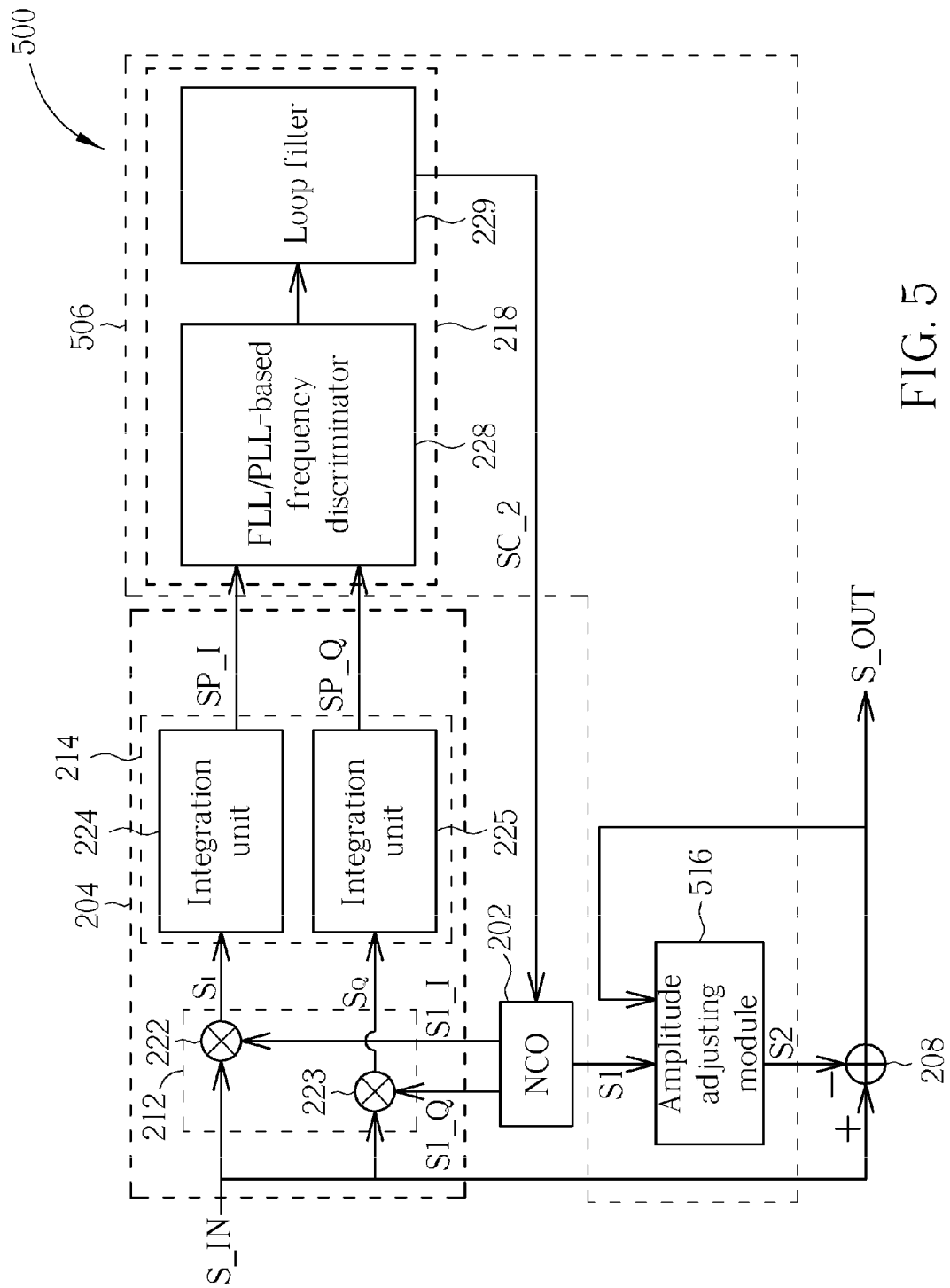
FIG. 5 is a diagram illustrating a second exemplary implementation of a signal processing apparatus according to the present invention.

Please refer to FIG. 5, which is a diagram illustrating a second exemplary implementation of a signal processing apparatus according to the present invention. The exemplary signal processing apparatus 500 is also based on the circuit configuration shown in FIG. 1. The exemplary signal processing apparatus 500 shown in FIG. 5 is similar to the exemplary signal processing apparatus 200 shown in FIG. 2, and the major different therebetween is the amplitude adjusting module 516 implemented in the signal adjusting circuit 506. In this exemplary embodiment, the amplitude adjusting module 516 is arranged to adjust the amplitude of the reference estimated signal S1 according to the output signal S_OUT and accordingly update the amplitude of the target estimated signal S2. For example, the amplitude adjusting module 516 updates the amplitude of the target estimated signal S2 by employing a least mean square (LMS) algorithm. However, this is for illustrative purposes only. The amplitude adjusting module 516 may employ other algorithm to adaptively update the amplitude of the target estimated signal S2 by referring to the output signal S_OUT which is resulted from subtracting the target estimated signal S2 from the input signal S_IN.

Figure 6:
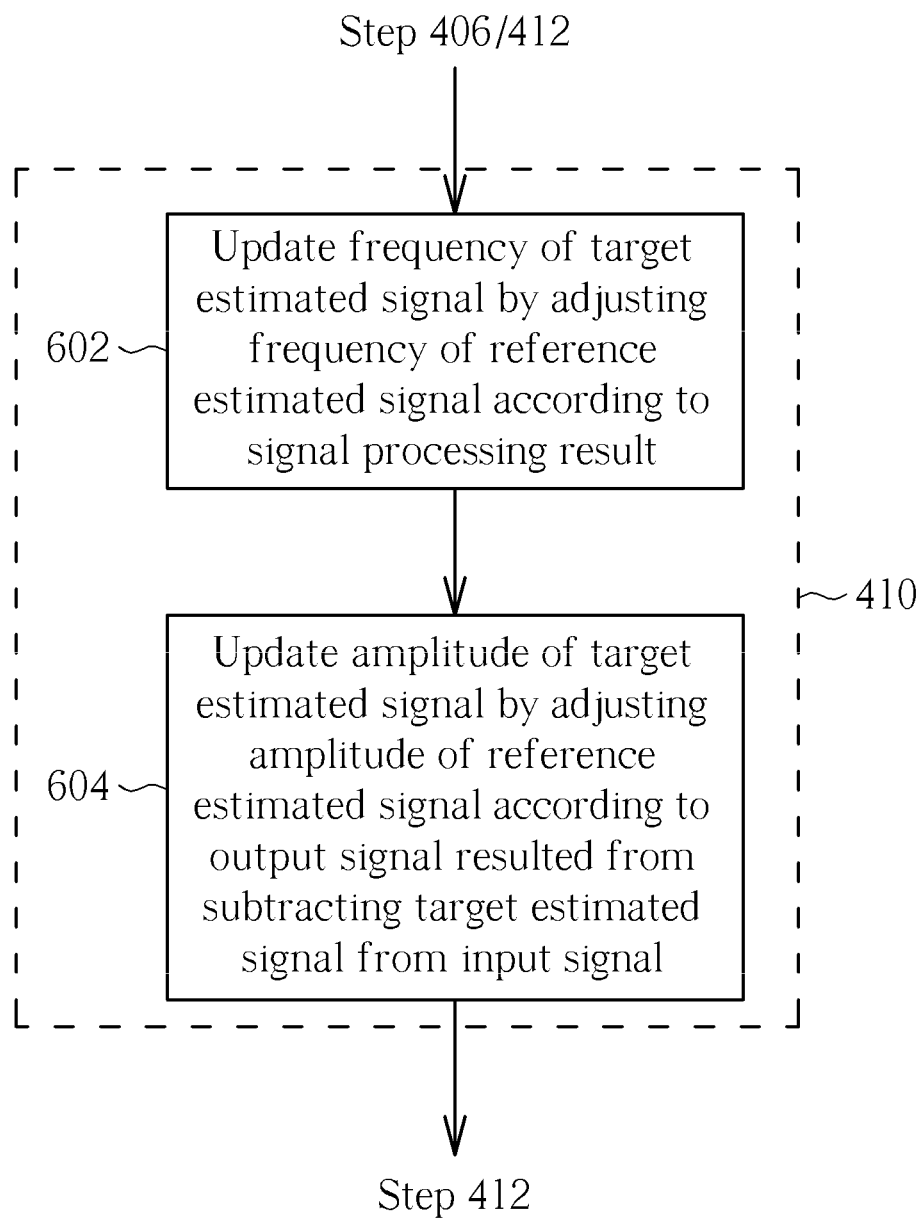
FIG. 6 is a diagram illustrating detailed operations of step 410 when the method shown in FIG. 4 is employed by the signal processing apparatus shown in FIG. 5.

FIG. 6 is a diagram illustrating detailed operations of the step 410 when the method shown in FIG. 4 is employed by the signal processing apparatus 500 shown in FIG. 5. The step of fine tuning the amplitude and the frequency of a target estimated signal generated from the reference estimated signal includes following steps.

Step 602: Update the frequency of a target estimated signal by adjusting the frequency of the reference estimated signal according to the signal processing result.

Step 604: Update the amplitude of the target estimated signal by adjusting the amplitude of the reference estimated signal according to an output signal resulted from subtracting the target estimated signal from the input signal.

As a person skilled in the art can readily understand operations of the steps shown in FIG. 6 after reading above paragraphs, further description is omitted here for the sake of brevity.

Regarding the signal processing apparatuses 200 and 500, the signal processing circuit 204 operates as a DFT circuit. Thus, the signal processing circuit 204 has low complexity. In addition, as the signal processing result is generated from integrating the mixer output, the signal adjusting circuit 206/506 processes an integration result of a plurality of data samples instead of processing each data sample. Therefore, the signal adjusting circuit 206/506 is allowed to operate under a lower clock rate, and thus may be easily realized using a processor such as a digital signal processor (DSP). Besides, using the signal adjusting circuit 206/506 operating under a lower clock rate can effectively reduce the power consumption of the signal processing apparatus 200/500.

Figure 7:
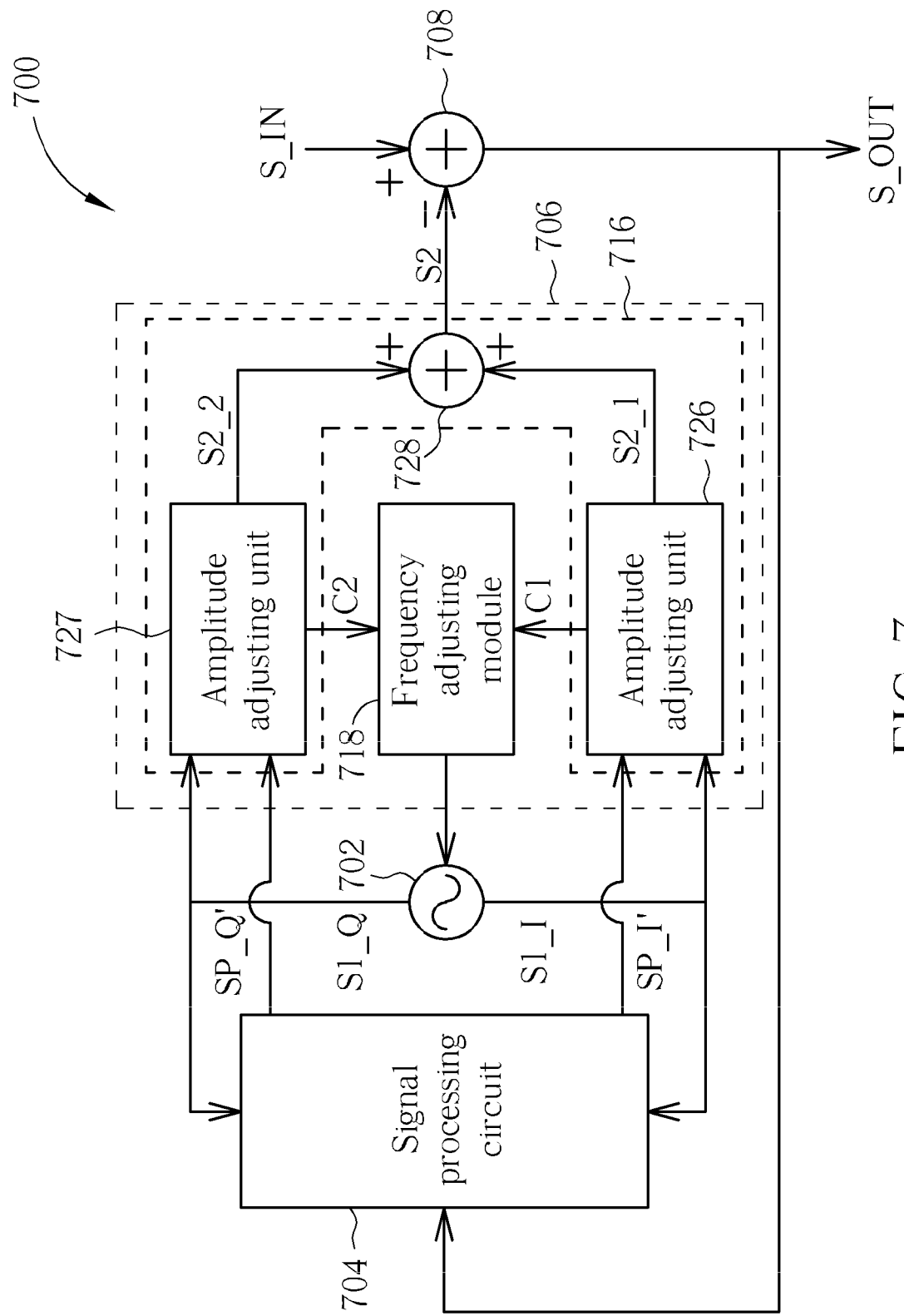
FIG. 7 is a diagram illustrating a third exemplary implementation of a signal processing apparatus according to the present invention.

Please refer to FIG. 7, which is a diagram illustrating a third exemplary implementation of a signal processing apparatus according to the present invention. The exemplary processing apparatus 700 is based on the circuit configuration shown in FIG. 1, and therefore has a signal source (e.g., an oscillator 702) which realizes the reference signal generating circuit 112 in FIG. 1, a signal processing circuit 704 which realizes the signal processing circuit 114 in FIG. 1, a signal adjusting circuit 706 which realizes the signal adjusting circuit 116 in FIG. 1, and a logic circuit (e.g., an adder 708) which realizes the signal subtracting unit 104 in FIG. 1. As can be seen from FIG. 7, the combination of the oscillator 702, the signal processing circuit 704, and the signal adjusting circuit 706 acts as the signal generating block 102 in FIG. 1. In this exemplary implementation, the signal adjusting circuit 706 includes an amplitude adjusting module 716 and a frequency adjusting module 718, wherein the amplitude adjusting module 716 has a plurality of amplitude adjusting units 726 and 727 and a logic circuit (e.g., an adder 728). The operation of the exemplary signal processing apparatus 700 shown in FIG. 7 is detailed as follows.

Suppose that the specific signal component in the input signal S_IN to be tracked is known to be a continuous wave signal. Thus, the oscillator 702 is implemented to generate a reference estimated signal including a sine wave part S1_I and a cosine wave part S1_Q. Please note that the sine wave part S1_I and the cosine wave part S1_Q have the same frequency and amplitude but different phases. The signal processing circuit 704 is coupled to the oscillator 702 and the adder 708, and arranged to generate a signal processing result including a first part SP_I' and a second part SP_I' according to the reference estimated signal generated from the oscillator 702 and an output signal S_OUT generated from the adder 708 subtracting a target estimated signal S2 from the input signal S_IN. By way of example, but not limitation, the signal processing circuit 704 adaptively updates the first part SP_I' and the second part SP_I' of the signal processing result, wherein the first part SP_I' and the second part SP_I' of the signal processing result give information indicative of the adjustment amounts applied to amplitudes of the sine wave part 511 and the cosine wave part S1_Q, respectively. For example, the signal processing circuit 704 may be an LMS-based circuit which is capable of updating the first part SP_I' and the second part SP_I' adaptively.

The amplitude adjusting module 716 determines an amplitude control setting, including a first gain value C1 and a second gain value C2, according to the signal processing result including the first part SP_I' and the second part SP_I', and generates the target estimated signal S2 by adjusting the amplitude of the reference estimated signal according to the amplitude control setting. More specifically, the amplitude adjusting unit 726 determines the first gain value C1 according to the first part SP_I', and the amplitude adjusting unit 727 determines the second gain value C2 according to the second part SP_Q'. In addition, the amplitude adjusting unit 726 adjusts the amplitude of the sine wave part S1_I of the reference estimated signal according to the first gain value C1 and accordingly generates a first adjusted signal S2_1, the amplitude adjusting unit 727 adjusts the amplitude of the cosine wave part S1_Q of the reference estimated signal according to the second gain value C2 and accordingly generates a second adjusted signal S2_2, and the adder 728 outputs the target estimated signal S2 by combining the first adjusted signal S2_1 and the second adjusted signal S2_2. In addition to adjusting the amplitude of the reference estimated signal (i.e., the amplitude of the target estimated signal S2), the signal adjusting circuit 706 may adjust the frequency of the reference estimated signal (i.e., the frequency of the target estimated signal S2) such that the target estimated signal S2 could be more similar to the specific signal component in the input signal S_IN. The oscillator 702 used to realize the reference signal generating circuit 112 in FIG. 1 is a controllable signal source which adjusts the frequency of the reference estimated signal (i.e., the frequencies of the sine wave part S1_I and the cosine wave part S1_Q) in response to a frequency control signal SC. The frequency adjusting module 718 is therefore implemented to generate the frequency control signal SC to the reference signal generating circuit (e.g., the oscillator 702) according to the amplitude control setting. More specifically, the frequency adjusting module 718, such as an FLL or a PLL, estimates a frequency offset between the frequency of the target estimated signal S2 and the frequency of the specific signal component in the input signal S_IN by referring to information (e.g., the first gain value C1 and the second gain value C2) derived from the reference estimated signal (e.g., the sine wave part S1_I and the cosine wave part S1_Q), and adjusts output frequency of the reference signal generating circuit (e.g., the oscillator 702) according to the frequency offset so as to decrease the frequency offset.

In this exemplary implementation shown in FIG. 7, the signal processing apparatus 700 may serve as a single-tone narrowband interference estimation and elimination apparatus. Thus, the target estimated signal S2 is an interference mimic corresponding to a single-tone interference signal in the input signal S_IN, and the adder 708 subtracts the target estimated signal S2 from the input signal S_IN to reduce or eliminate the single-tone interference signal in the input signal S_IN.

Figure 8:
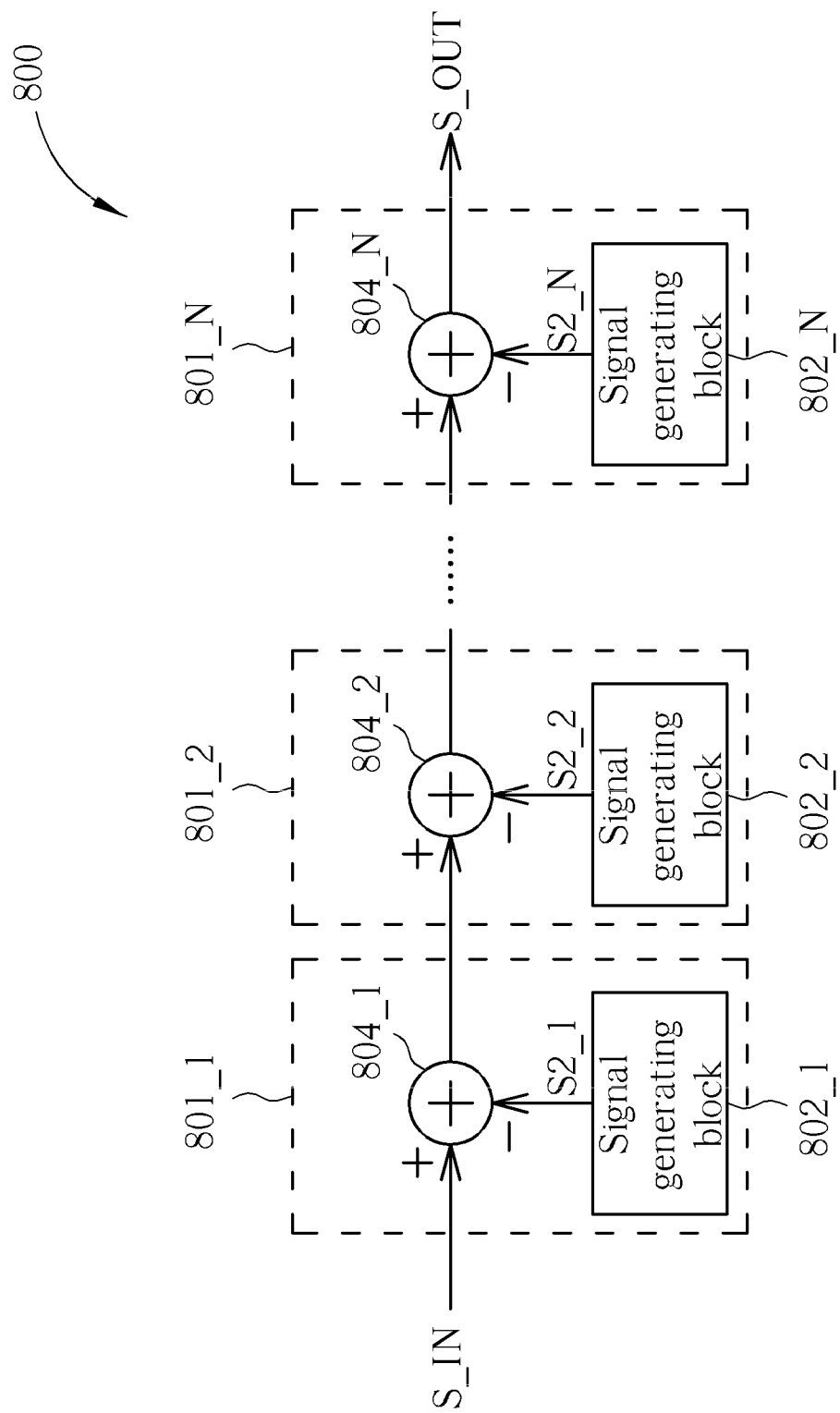
FIG. 8 is a diagram illustrating a multi-tone narrowband interference estimation and elimination apparatus according to an exemplary embodiment of the present invention.

When the signal processing apparatuses 100, 200, 500, and 700 are used to realize a single-tone narrowband interference estimation and elimination apparatuses, each of the signal processing apparatuses 100, 200, 500, and 700 is capable of tracking and eliminating a single jammer signal in the input signal S_IN at one operation timing. However, using the proposed circuit structure to realize a multi-tone narrowband interference estimation and elimination apparatus is feasible. Please refer to FIG. 8, which is a diagram illustrating a multi-tone narrowband interference estimation and elimination apparatus according to an exemplary embodiment of the present invention. The exemplary multi-tone narrowband interference estimation and elimination apparatus 800 includes a plurality of single-tone narrowband interference estimation and elimination apparatuses 801_1-801_N each having the circuit structure shown in FIG. 1. Thus, as shown in FIG. 8, the single-tone narrowband interference estimation and elimination apparatus 801_1 include a signal generating block 802_1 and a signal subtracting unit 804_1, the single-tone narrowband interference estimation and elimination apparatus 801_2 include a signal generating block 802_2 and a signal subtracting unit 804_2, and the single-tone narrowband interference estimation and elimination apparatus 801_N include a signal generating block 802_N and a signal subtracting unit 804_N. The signal subtracting units 804_1,-804_N form a signal subtracting circuit. By way of example, but not limitation, any of the single-tone narrowband interference estimation and elimination apparatuses 801_1-801_N may be implemented using the signal processing apparatus 200/500/700. The single-tone narrowband interference estimation and elimination apparatus 801_1-801_N are configured to track jammer signals in different frequency bands, respectively. Therefore, multiple jammer signals can be simultaneously suppressed using the circuit structure shown in FIG. 8. That is, the signal subtracting units 804_1-804_N are arranged to subtract target estimated signals respectively generated by the signal generating blocks 802_1-802_N from the input signal S_IN and accordingly generate an output signal S_OUT. As a person skilled in the art can readily understand operation of the single-tone narrowband interference estimation and elimination apparatuses 801_1-801_N after reading above paragraphs directed to the signal processing apparatuses 100, 200, 500, and 700, further description is omitted here for the sake of brevity.

Moreover, in another embodiment, the target estimated signals respectively generated by the signal generating blocks 802_1-802_N can be added to generate a summed target estimated signal, and then a signal subtracting circuit subtracts the summed target estimated signal from the input signal S_IN. These modifications should also fall into the scope of the present invention.

Those skilled in the art will readily observe that numerous modifications and alterations of the device and method may be made while retaining the teachings of the invention.

What is claimed is:
1. A signal processing apparatus, comprising:
a signal generating block, arranged to generate a target estimated signal of a specific signal component in an input signal, comprising:
a reference signal generating circuit, arranged to generate a reference estimated signal for the specific signal component in the input signal;
a signal processing circuit, coupled to the reference signal generating circuit, the signal processing circuit arranged to process the reference estimated signal and accordingly generate a signal processing result; and
a signal adjusting circuit, coupled to the signal processing circuit and the reference signal generating circuit, the signal adjusting circuit arranged to output the target estimated signal by adjusting the reference estimated signal according to the signal processing result;
wherein the signal processing circuit comprises:
a mixer module, arranged to generate a mixer output by mixing the input signal and the reference estimated signal; and
an integration module, coupled to the mixer module, the integration module arranged to integrate the mixer output and accordingly generate the signal processing result; and
the signal adjusting circuit comprises:
an amplitude adjusting module, arranged to adjust an amplitude of the reference estimated signal according to the signal processing result; and
a frequency adjusting module, arranged to generate a frequency control signal to the reference signal generating circuit according to the signal processing result, wherein the frequency adjusting module comprises:
a frequency discriminator, arranged to discriminate a frequency offset between a frequency of the estimate signal and a frequency of the specific signal component of the input signal; and
a filter, arranged to generate the frequency control signal according to an output of the frequency discriminator.

2. The signal processing apparatus of claim 1, wherein the signal adjusting circuit is realized by a processor.

3. The signal processing apparatus of claim 1, wherein the amplitude adjusting module comprises:
an amplitude control unit, arranged to generate a gain control signal according to the signal processing result; and
an amplifier unit, coupled to the amplitude control unit, the amplifier unit arranged to receive the gain control signal and outputting the target estimated signal by amplifying the reference estimated signal with a gain value set in response to the gain control signal.

4. The signal processing apparatus of claim 1, further comprising:
a signal subtracting unit, coupled to the signal generating block, the signal subtracting unit arranged to subtract the target estimated signal generated by the signal adjusting circuit from the input signal of the signal processing apparatus and accordingly generate an output signal of the signal processing apparatus.

5. The signal processing apparatus of claim 4, wherein the signal processing circuit is further coupled to the signal subtracting unit, and generates the signal processing result according to the output signal and the reference estimated signal.

6. The signal processing apparatus of claim 5, wherein the amplitude adjusting module is arranged to determine an amplitude control setting according to the signal processing result and generate the target estimated signal by adjusting an amplitude of the reference estimated signal according to the amplitude control setting.

7. The signal processing apparatus of claim 1, wherein the signal adjusting circuit adjusts the reference estimated signal according to a comparison result of a magnitude of the signal processing result and a predetermined threshold.

8. A signal processing method, comprising:
generating a reference estimated signal for a specific signal component in an input signal;
processing the reference estimated signal and accordingly generating a signal processing result; and
outputting a target estimated signal of the specific signal component in the input signal by adjusting the reference estimated signal according to the signal processing result;
wherein the step of generating the signal processing result according to the input signal and the reference estimated signal comprises:
generating a mixer output by mixing the input signal and the reference estimated signal; and
generating the signal processing result by integrating the mixer output; and
wherein the step of adjusting the reference estimated signal according to the signal processing result comprises:
adjusting an amplitude of the reference estimated signal according to the signal processing result
discriminating a frequency offset between a frequency of the estimate signal and a frequency of the specific signal component of the input signal; and
generating a frequency control signal according to a discriminating result to adjust a frequency of the reference estimated signal.

9. The signal processing method of claim 8, wherein the step of adjusting the amplitude of the reference estimated signal according to the signal processing result comprises:
generating a gain control signal according to the signal processing result; and
amplifying the reference estimated signal with a gain value set in response to the gain control signal.

10. The signal processing method of claim 8, further comprising:
generating an output signal by subtracting the target estimated signal from the input signal.

11. The signal processing method of claim 10, wherein the step of processing the reference estimated signal and accordingly generating the signal processing result comprises:
generating the signal processing result according to the output signal and the reference estimated signal.

12. The signal processing method of claim 11, wherein the step of adjusting the reference estimated signal according to the signal processing result comprises:
determining an amplitude control setting according to the signal processing result; and
generating the target estimated signal by adjusting an amplitude of the reference estimated signal according to the amplitude control setting.

13. The signal processing method of claim 8, wherein the step of adjusting the reference estimated signal according to the signal processing result comprises:
adjusting the reference estimated signal according to a comparison result of a magnitude of the signal processing result and a predetermined threshold.

14. A signal processing apparatus, comprising:
a signal generating block, arranged to generate a target estimated signal of a specific signal component in an input signal, comprising:
a reference signal generating circuit, arranged to generate a reference estimated signal for the specific signal component in the input signal;
a signal processing circuit, coupled to the reference signal generating circuit, the signal processing circuit arranged to process the reference estimated signal and accordingly generate a signal processing result; and
a signal adjusting circuit, coupled to the signal processing circuit and the reference signal generating circuit, the signal adjusting circuit arranged to output the target estimated signal by adjusting the reference estimated signal according to the signal processing result;

wherein the signal adjusting circuit comprises:
an amplitude adjusting module, arranged to adjust an amplitude of the reference estimated signal according to the signal processing result; and
a frequency adjusting module, arranged to generate a frequency control signal to the reference signal generating circuit according to the signal processing result, wherein the frequency adjusting module comprises:
a frequency discriminator, arranged to discriminate a frequency offset between a frequency of the estimate signal and a frequency of the specific signal component of the input signal; and
a filter, arranged to generate the frequency control signal according to an output of the frequency discriminator.

15. A signal processing apparatus, comprising:
a signal generating block, arranged to generate a target estimated signal of a specific signal component in an input signal, comprising:
a reference signal generating circuit, arranged to generate a reference estimated signal for the specific signal component in the input signal;
a signal processing circuit, coupled to the reference signal generating circuit, the signal processing circuit arranged to process the reference estimated signal and accordingly generate a signal processing result; and
a signal adjusting circuit, coupled to the signal processing circuit and the reference signal generating circuit, the signal adjusting circuit arranged to output the target estimated signal by adjusting the reference estimated signal according to the signal processing result;
wherein the reference signal generating circuit adjusts a frequency of the reference estimated signal in response to a frequency control signal, and the signal adjusting circuit comprises:
a frequency adjusting module, arranged to generate the frequency control signal to the reference signal generating circuit according to the signal processing result, comprising:
a frequency discriminator, arranged to discriminate a frequency offset between a frequency of the estimate signal and a frequency of the specific signal component of the input signal; and
a filter, arranged to generate the frequency control signal according to an output of the frequency discriminator.

16. A signal processing method, comprising:
generating a reference estimated signal for a specific signal component in an input signal;
processing the reference estimated signal and accordingly generating a signal processing result; and
outputting a target estimated signal of the specific signal component in the input signal by adjusting the reference estimated signal according to the signal processing result;
wherein the step of adjusting the reference estimated signal according to the signal processing result comprises:
adjusting an amplitude of the reference estimated signal according to the signal processing result;
discriminating a frequency offset between a frequency of the estimate signal and a frequency of the specific signal component of the input signal; and
generating a frequency control signal according to a discriminating result to adjust a frequency of the reference estimated signal.

17. A signal processing method, comprising:
generating a reference estimated signal for a specific signal component in an input signal;
processing the reference estimated signal and accordingly generating a signal processing result; and
outputting a target estimated signal of the specific signal component in the input signal by adjusting the reference estimated signal according to the signal processing result;
wherein the step of generating the reference estimated signal comprises:
adjusting a frequency of the reference estimated signal in response to a frequency control signal; and
the step of adjusting the reference estimated signal according to the signal processing result comprises:
discriminating a frequency offset between a frequency of the estimate signal and a frequency of the specific signal component of the input signal; and
generating a frequency control signal according to a discriminating result to adjust a frequency of the reference estimated signal.

* * * * *